United States Patent
Peng et al.

(10) Patent No.: US 6,728,488 B1
(45) Date of Patent: Apr. 27, 2004

(54) OPTICAL SYSTEMS EMPLOYING ANAMORPHIC BEAMS AND DIFFRACTION GRATINGS

(75) Inventors: Song "Sean" Peng, Pleasanton, CA (US); Ming "Miles" Li, Pleasanton, CA (US)

(73) Assignee: Avanex Corporation, Fremont, CA (US)

( * ) Notice: Subject to any disclaimer, the term of this patent is extended or adjusted under 35 U.S.C. 154(b) by 30 days.

(21) Appl. No.: 10/056,452

(22) Filed: Jan. 23, 2002

Related U.S. Application Data

(60) Provisional application No. 60/264,615, filed on Jan. 26, 2001.

(51) Int. Cl.[7] .............................. H04J 14/02; G02B 27/12
(52) U.S. Cl. .......................... 398/86; 358/87; 359/639; 359/640
(58) Field of Search .................................. 359/129, 130, 359/639, 640, 115, 124; 385/37, 36; 398/86–87, 43

(56) References Cited

U.S. PATENT DOCUMENTS

| | | | |
|---|---|---|---|
| 6,339,504 B1 | * | 1/2002 | Oliva .......................... 359/641 |
| 6,441,934 B1 | * | 8/2002 | Boord et al. ................. 359/130 |

\* cited by examiner

*Primary Examiner*—Scott J. Sugarman
*Assistant Examiner*—Darryl J. Collins
(74) *Attorney, Agent, or Firm*—Sawyer Law Group LLP

(57) ABSTRACT

An optical device includes: a collimator; at least one anamorphic pair of prisms optically coupled to the collimator; a diffraction grating optically coupled to the at least one anamorphic pair of prisms at a side opposite to the collimator; and a focusing lens optically coupled to the diffraction grating. The anamorphic pair of prisms permits light incident upon the diffraction grating to be relatively narrow in a dimension perpendicular to the dispersive direction of the grating so that the grating can produce high spectral resolution while preserving compact system size and simplicity.

30 Claims, 2 Drawing Sheets

OPTICAL SYSTEMS EMPLOYING ANAMORPHIC BEAMS AND DIFFRACTION GRATINGS

CROSS-REFERENCE TO RELATED APPLICATIONS

This application is a regular patent application to U.S. Provisional Patent Application Serial No. 60/264,615, titled "Optical Systems Employing Anamorphic Beams and Diffraction Gratings", filed Jan. 26, 2001.

FIELD OF THE INVENTION

The present invention relates to multiplexers and de-multiplexers for wavelength division multiplexed optical communications systems. More particularly, the present invention relates to multiplexers and de-multiplexers that utilize diffraction gratings to either separate or combine optical channels carried in such optical communications systems.

BACKGROUND OF THE INVENTION

In a wavelength division multiplexing optical communication system, information is carried by multiple channels each with a distinct wavelength. It is often necessary to separate, combine, selectively attenuate or amplify each wavelength channel. In order to perform these functions one usually needs to spatially separate the wavelength channels from one another. In this document, these individual information-carrying lights of a wavelength division multiplexing optical fiber, optical line or optical system are referred to as either "signals" or "channels." The totality of multiple combined signals, wherein each signal is of a different wavelength range, is herein referred to as a "composite optical signal." Although each information-carrying channel actually comprises light of a certain range of physical wavelengths, for simplicity, a single channel is referred to as a single wavelength, $\lambda$, and a plurality of n such channels are referred to as "n wavelengths" denoted $\lambda_1 - \lambda_n$.

A de-multiplexer is an apparatus that receives a composite optical signal comprising a plurality of wavelengths or channels and separates the channels among a plurality of respective outputs. A multiplexer is an apparatus that receives a plurality of wavelengths or channels from separate respective inputs and combines them into a single composite optical signal directed to a single output. Because light paths are generally reversible through most optical components and apparatuses, such separation or combination can generally be performed by a single apparatus, depending upon the direction of light through the apparatus. Such an apparatus that can be utilized as either a multiplexer or a de-multiplexer is herein termed a multiplexer/de-multiplexer (MUX/DEMUX).

A diffraction grating is an effective wavelength dispersive component that can be used to separate wavelength channels. It is known that the resolving power of a diffraction grating not only depends on angular dispersion of the grating setup, it also depends on the size of the optical beam that is incident on the grating. The resolving power can be written as:

$$\frac{\lambda}{\Delta\lambda} = mN$$

where $\lambda$ is center wavelength, $\Delta\lambda$ is the minimum wavelength difference that can be resolved, m is diffraction order, and N is the number of "grooves" that are illuminated by the incident optical beam. Apparently, because N is proportional to the width of the incident optical beam, the resolving power is linearly proportional to the width of the incident beam.

It is also necessary for the divergence of an optical beam incident upon the grating to be smaller then the angular dispersion provided by the grating to effectively separate two adjacent wavelength channels. If a lens is used to collect the diffracted beams and focus them to different respective spots, the resolving power expression also means that the diffracted beam of a wavelength channel must be focused into a spot that is smaller than the spatial separation of two adjacent wavelength channels at the focal plane.

Fiber collimators are often used to collimate divergent optical beams emerging from optical fibers. Because an optical beam emitted from a single-mode fiber is circular, the collimated beam possess a round cross section. The diameter of the collimated beam is proportional to the focal length of the collimating lens. To achieve large beam size so as to illuminate an adequate number of grating grooves, one can choose a long focal length collimating lens. However, if this is done, subsequent optical systems must also be designed to handle large beams. This usually creates an increase in system complexity and overall size.

It is realized by the inventors of the present invention that, that for most fiber optics applications, the incident beam only needs to have a large width in the dispersive direction of the grating—that is, perpendicular to the grating "grooves" or other diffraction-causing pattern on the grating. This means that an anamorphic optical beam with an elliptical cross-section can be utilized to achieve high spectral resolution while preserving compact system size and simplicity. There is therefore a need, in the art, for a grating-based MUX/DEMUX that can utilize anamorphic optics and anamorphic beams to minimize device size while maintaining adequate resolving power.

SUMMARY OF THE INVENTION

To address the above-mentioned need, an apparatus and a method for an improved grating multiplexer/de-multiplexer (MUX/DEMUX) apparatus are herein provided. The present invention discloses an apparatus and a method that employs anamorphic or elliptical optical beams to achieve high spectral resolution and yet compact device size. In a first preferred embodiment, a MUX/DEMUX apparatus in accordance with the present invention comprises an optical device providing multi-channel input light, a collimator optically coupled to the optical device, an anamorphic pair of prisms optically coupled to the collimator opposite to the optical device, a diffraction grating optically coupled to the anamorphic pair of prisms at a side opposite to the collimator and a focussing lens optically coupled to the diffraction grating.

In a second preferred embodiment, a MUX/DEMUX apparatus in accordance with the present invention comprises an optical device providing multi-channel input light, a collimator optically coupled to the optical device, an anamorphic pair of prisms optically coupled to the collimator opposite to the optical device, a diffraction grating optically coupled to the anamorphic pair of prisms at a side opposite to the collimator, a focussing lens optically coupled to the diffraction grating and a micro-mirror array optically coupled to the focusing lens at a side opposite to the diffraction grating, wherein each micro-mirror comprising the micro-mirror array is disposed at a focal point of a different respective channel.

In operation of a grating MUX/DEMUX in accordance with the present invention as a de-multiplexer, a light comprising a composite optical signal received from the optical device is collimated into a beam with a circular cross section by the collimator and expanded substantially only along one dimension by the anamorphic pair of prisms. The resulting anamorphic light beam with elliptical cross section is then directed to the diffraction grating whereat it is separated, by diffraction, into its component channels. The separated, anamorphic or elliptical light beams comprising the diffracted channels are then focused to a plurality of respective focal points by the focussing lens.

Operation of the same apparatus as a multiplexer occurs when a plurality of channels are input to the apparatus from optical devices disposed at the locations of the respective focal points.

DETAILED DESCRIPTION OF THE INVENTION

The present invention provides an improved grating multiplexer/de-multiplexer (MUX/DEMUX) for use within optical communications networks. The following description is presented to enable one ordinary skill in the art to make and use the invention and is provided in the context of a patent application and its requirements. Various modifications to the preferred embodiments will be readily apparent to those skilled in the art and the generic principles described herein may be applied to other embodiments. Thus, the present invention is not intended to be limited to the embodiments shown but is to be accorded the widest scope consistent with the principles and features described herein. In order to gain a detailed understanding of the construction and operation of the grating MUX/DEMUX of the present invention, the reader is referred to the appended FIGS. 1–2 in conjunction with the following description.

Figure 1:
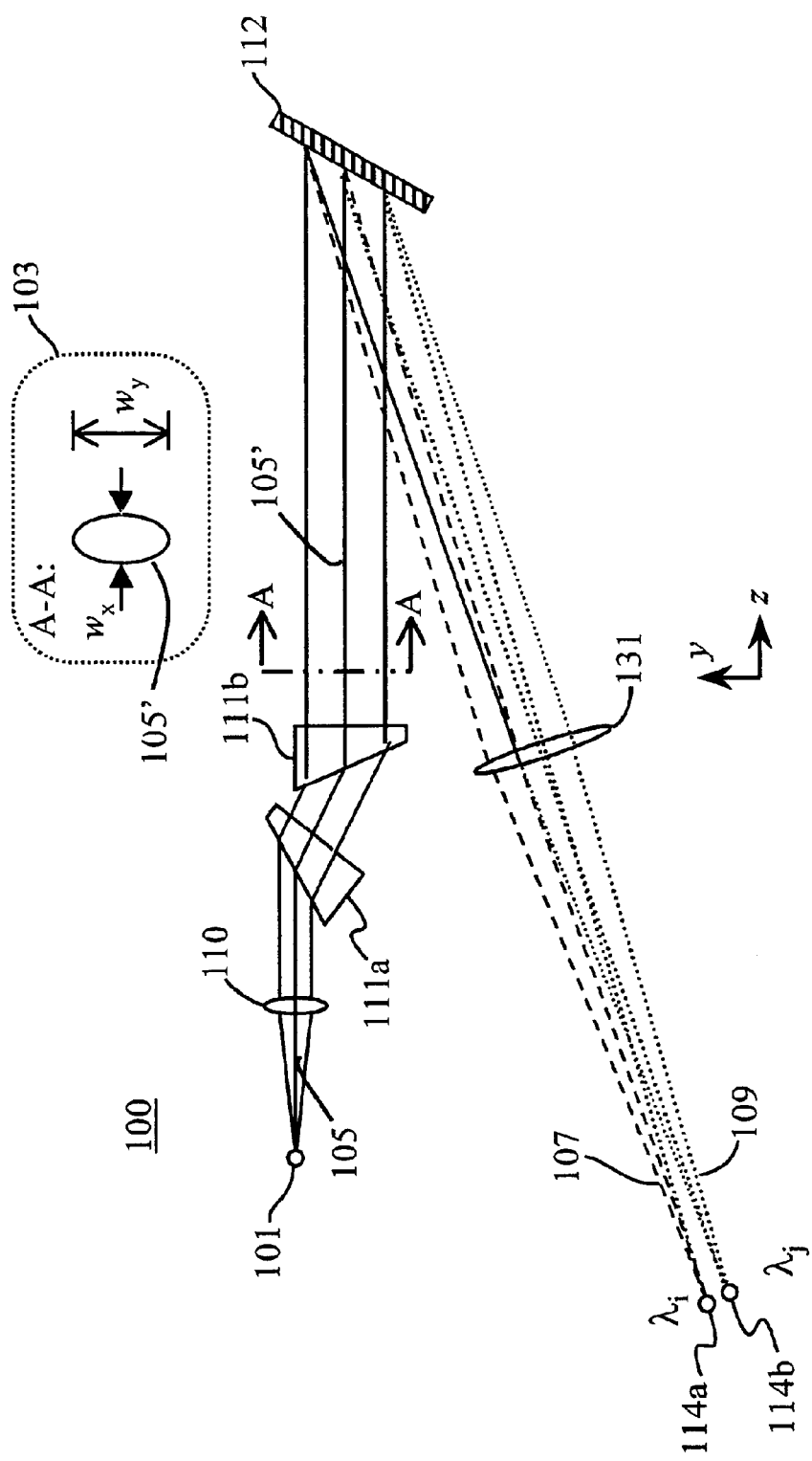
FIG. 1 illustrates a first preferred embodiment of a grating MUX/DEMUX in accordance with the present invention.

FIG. 1 illustrates a first preferred embodiment of a grating MUX/DEMUX in accordance with the present invention. The MUX/DEMUX 100 shown in FIG. 1 comprises an anamorphic pair of prisms comprising a first prism 111a and a second prism 111b. The anamorphic pair of prisms 111a–111b is optically coupled to a collimator (or collimator lens) 110 and at a first side and are optically coupled to a diffraction grating 112 at a second side. The collimator 110 is preferably optically coupled to a device (not shown), such as an optical fiber, disposed at the focal point 101 at a side opposite to the anamorphic pair of prisms 111a–111b. It is assumed that the drawing of FIG. 1 depicts a projection onto the y-z plane—that is, the plane parallel to both the y-axis and the z-axis, as indicated—and that the "grooves" or other diffraction-producing pattern of the diffraction grating 112 lie perpendicular to the plane of the drawing and parallel to the x-axis. Thus, the grating disperses light of different channels within the y-z plane.

In the discussion of the grating MUX/DEMUX 100 that follows, it is assumed that the apparatus 100 functions as a de-multiplexer. In operation as a de-multiplexer, light comprising a composite optical signal 105 is delivered to the MUX/DEMUX 100 from an optical device disposed at a focal point 101. The optical device at the focal point 101 may be a light source or a light transmitting device such as optical fiber. The composite optical signal 105 comprises a plurality of n optical channels $\lambda_1$–$\lambda_n$. The light of composite optical signal 105 emanating from the device at focal point 101 is collimated by the collimator 110. In cross section, this light comprises a circular beam. This light of the composite optical signal 105 then passes through the anamorphic pair of prisms 111a–111b from left to right, as drawn, whereby the circular beam from the collimator 10 is converted into an anamorphic beam 105' which generally has an elliptical cross section.

Box 103 of FIG. 1 illustrates a cross section of the light of composite optical signal 105' in the cross section A—A after the light has passed through the pair of prisms 111a–111b. The width of the anamorphic or elliptical beam 105' in the y direction $w_y$ is greater than its width in the x direction $w_x$ because the pair of prisms 111a–111b expands the beam 105' only along the y dimension. In FIG. 1, the x-axis is perpendicular to the plane of the drawing. The width $w_x$ is substantially equal to the diameter of the circular cross section of the light beam comprising composite optical signal 105 between the collimator 110 and the prism 111a. The anamorphic or elliptical beam of the light of the composite optical signal 105' then passes to the diffraction grating 112 at which its constituent channels are angularly and spatially dispersed by diffraction. Since the "grooves" or other patterning of the grating 112 run(s) parallel to the x dimension, the elliptical shape of the anamorphic beam 105' permits the beam to cover a large number of grooves without utilizing a wide grating. The grooves of grating 112 are aligned in the x direction thus the dispersive direction of the grating 112 is in the y-z plane. With a large beam width along the y direction, the resolving power is increased compared with the case without the anamorphic prisms 111a–111b. The beam size in the x direction is not changed with the anamorphic prisms 111a–111b, thus the overall height of the system is maintained. A narrow grating can thus be utilized without any degradation in its resolving power.

The pathways of only two diffracted channels—a channel 107 comprising a relatively shorter wavelength $\lambda_i$ and another channel 109 comprising a relatively longer wavelength $\lambda_j$, wherein $(\lambda_j > \lambda_i)$—are shown in FIG. 1. Channel 107 is indicated by dashed lines whilst channel 109 is indicated by dotted lines. Although the pathways of only two channels are shown, it is to be understood that a plurality of channels having different wavelengths may also exist and that the light of each such channel will follow its own unique path after diffraction by the grating 112. After diffraction by the grating 112, the lights of the channels 107–109 and any other channels pass through the focussing lens 131 from right to left, as drawn. The beams of the channels 107–109 are focussed by the focusing lens 131 to two different focal points 114a–114b, respectively. Other channels comprising other physical wavelengths will be focused to their own respective focal points lying, approximately, along a line joining the focal points 114a–114b. Preferably, separate light receiving, conditioning, or transmitting devices (not shown), such as optical fibers, are disposed at the points 114a–114b as well as at focal points of other channels (not shown). If the grating MUX/DEMUX 100 is operated as a multiplexer, then lights of the wavelengths $\lambda_i$, and $\lambda_j$ are input to the apparatus 100 at the points 114a–114b, respectively, and the pathways followed by the channels are opposite from those just described above.

Figure 2:
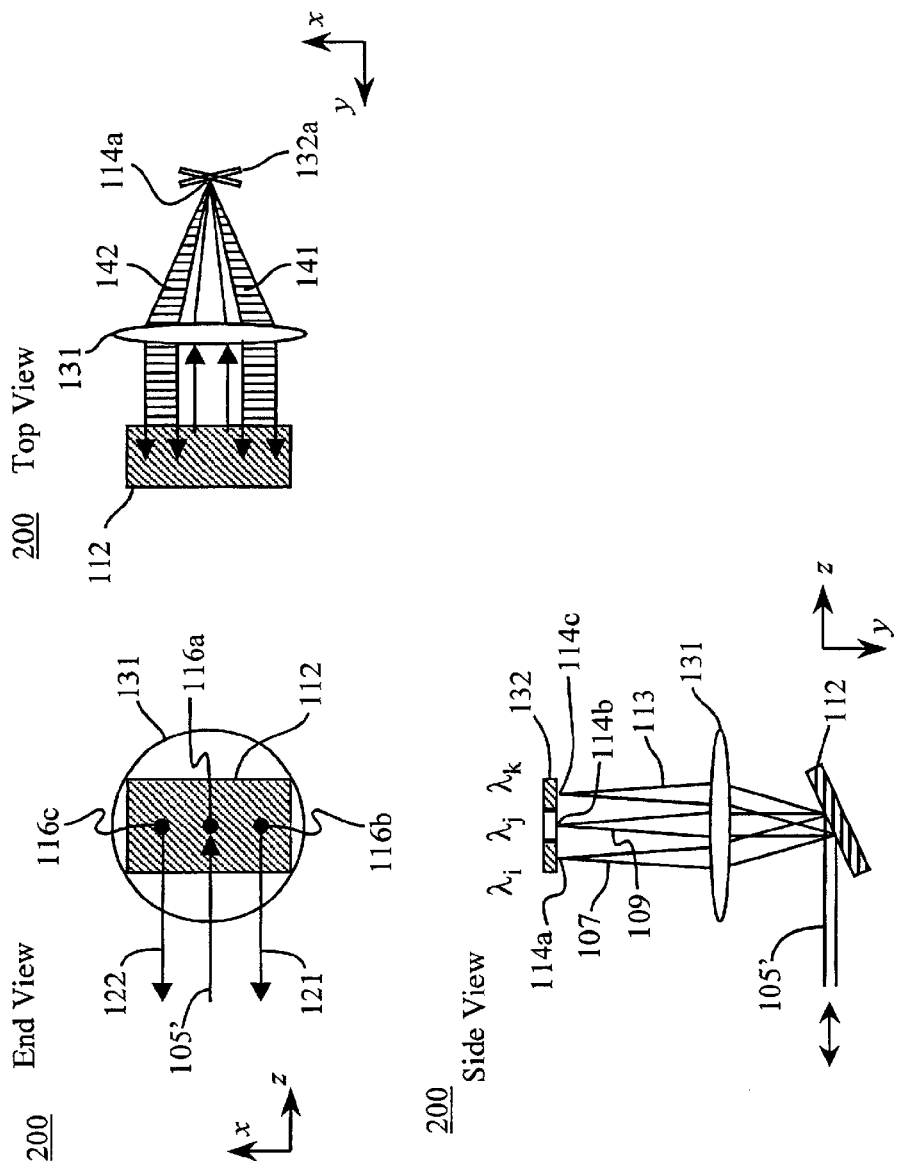
FIG. 2 illustrates a second preferred embodiment of a MUX/DEMUX in accordance with the present invention.

The basic setup as shown in FIG. 1 can be used in many wavelength-selective devices at both input and output ends to reduce optical design complexity and overall device size. FIG. 2 illustrates a second preferred embodiment of a MUX/DEMUX in accordance with the present invention, wherein the MUX/DEMUX further functions as a wavelength-selective optical switch. The switching function of the MUX/DEMUX 200 (FIG. 2) is disclosed in greater detail in a co-pending U.S. Patent Application titled "An Optical Wavelength Router Using Reflective Surfaces to Direct Output Signals", Ser. No. 09/794,590, filed on Feb. 26, 2001, which claims priority from a U.S. Provisional Patent Application with Ser. No. 60/211,347, filed Jun. 13, 2000, both of which are incorporated by reference herein in their entirety.

FIG. 2 provides three mutually orthogonal views of the portion of the apparatus 200 between the grating 112 and the focal points 114a–114b. For clarity, the components to the left of the pathway of the composite optical 105—comprising the collimator 110 and the pair of prisms 111a–111b—are not shown in FIG. 2. The grating MUX/DEMUX 200 comprises all the components comprising the grating MUX/DEMUX 100 shown in FIG. 1. Further, within the grating MUX/DEMUX 200, a micro-mirror array 132 is disposed such that a different respective micro-mirror comprising the array 132 is disposed at each of the focal points 114a, 114b, etc. This "Side View" is assumed to represent a projection of the apparatus 200 onto the y-z plane and shows three channels $\lambda_i$, $\lambda_j$ and $\lambda_k$ dispersed by grating 112 and respectively focused to different points 114a, 114b and 114c by focal lens 131. This view is similar to that shown in FIG. 1. Each micro mirror of the array 132 is disposed at a respective one of the focal points 114a, 114b and 114c as shown in the Side View of FIG. 2.

Each mirror comprising the array 132 may be tilted independently of every other micro-mirror as shown in the "Top View" diagram of FIG. 2. The Top View shown in FIG. 2 is a In projection onto the x-y plane and shows the operation of only one mirror comprising the micro-mirror array 132, i.e., the particular mirror 132a disposed at the focal point 114a and receiving the channel $\lambda_i$. The mirror disposed at the point 114a receives the $\lambda_i$ channel focused by lens 131 and can tilt into any of a plurality of positions so as to redirect the reflected beam along a plurality of return paths back through the apparatus 200. In the example shown in FIG. 2, it is assumed that each mirror of the micro-mirror array can assume just two positions. Accordingly, the reflected channel $\lambda_i$ propagates either along the path 141 or the path 142 as shown in the Top View diagram of FIG. 2. The channel $\lambda_i$ propagates only along one of these paths at any one particular time, depending upon the position of the mirror 132a. After passing back through the lens 131, the paths 141–142 are substantially parallel to one another and parallel to the path 107 of the channel $\lambda_i$ prior to reflection.

As seen in the "End View" diagram of FIG. 2, the tilting of the various mirrors returns all the channels to regions centered upon either the point 116b or the point 116c on the surface of the grating 112. A first set of channels that follow a path, such as path 141, arrive at a region centered about the point 116b whilst a second set of channels that follow a path, such as path 142, arrive at a region centered about the point 116c. By contrast, the composite optical signal 105 diffracts from a region centered upon the point 116a. The first set and the second set of channels are then combined by the diffraction grating 112 into output beams 121 and 122, respectively. Both of these output beams pass back through the prisms 111a–111b and the collimator lens 110 (not shown in FIG. 2) to different respective outputs. The anamorphic prisms inserted into the path of the input beam 105 and the output beams 121–122 cause the beam widths in y direction to be increased. The widths of the output beams 121–122 are condensed upon passing through the pair of prisms 111a–111b in the reverse direction. Thus without changing other design parameters, the spectral resolution can be increased to handle smaller channel spacings. Alternatively, one may choose to maintain the same beam width in the y-direction and reduce the width along the x direction. The input and output beams could then be placed closer along the x direction. This would result in smaller overall width. At the same time, it would reduce the required angular movements of the micro-mirror array 132 and reduce the effective aperture of the lens 131 in the x direction, thus permitting a less complex lens to be used. Although the embodiments described above utilize anamorphic prisms, other techniques, including for example a pair of cylindrical lenses can also generate anamorphic or elliptical beams.

An apparatus and a method for an improved grating multiplexer/de-multiplexer has been disclosed. A preferred embodiment of a grating MUX/DEMUX in accordance with the present invention comprises an optical device providing a composite optical signal, a collimator optically coupled to the optical device, an anamorphic pair of prisms wherein the anamorphic pair of prisms is optically coupled to the collimator opposite to the optical device, a diffraction grating optically coupled to the anamorphic pair of prisms and dispersing the channels comprising the composite optical signal, and a focussing lens optically coupled to the diffraction grating focussing each channel to a respective focal point. The anamorphic pair of prisms permits the beam incident upon the diffraction grating to be relatively narrow in a dimension perpendicular to the dispersive direction of the grating so that the grating can produce high spectral resolution while preserving compact system size and simplicity.

Although the present invention has been disclosed in accordance with the embodiments shown, one of ordinary skill in the art will readily recognize that there could be variations to the embodiments shown and those variations would be within the spirit and scope of the present invention. Accordingly, many modifications may be made by one of ordinary skill in the art without departing from the spirit and scope of the appended claims.

What is claimed is:

1. A demultiplexing device comprising:

a collimator;

at least one anamorphic pair of prisms optically coupled to the collimator, wherein the collimator is optically coupled at a side opposite to the at least one anamorphic pair of prisms to an input device for providing a multi-channel light;

a diffraction grating optically coupled to the at least one anamorphic pair of prisms at a side opposite to the collimator; and a focusing lens optically coupled to the diffraction grating, wherein the focusing lens is optically coupled at a side opposite to the diffraction grating to at least one output device for receiving at least one channel of the multi-channel light.

2. The device of claim 1, wherein the multi-channel light comprises a circular cross-section.

3. The device of claim 2, wherein the multi-channel light is converted by the at least one anamorphic pair of prisms such that the multi-channel light comprises an anamorphic cross-section.

4. The device of claim 1, wherein the optical device is a multiplexing device, wherein he focusing lens is optically coupled at a side opposite to the diffraction grating to at least one input device for providing a plurality of channels, and wherein the collimator is optically coupled at a side opposite to the at least one anamorphic pair of prisms to an output device for receiving a multi-channel light, wherein the multi-channel light comprises the plurality of channels.

5. The device of claims 4, wherein the plurality of channels each comprises an anamorphic cross-section.

6. The device of claim 5, wherein the multi-channel light is converted by the at least one anamorphic pair of prisms such that the multi-channel light comprises a circular cross-section.

7. The device of claim 1, further comprising:
a micro-mirror array optically coupled to the focusing lens at a side opposite to the diffraction grating, wherein each mirror in the array reflects at least one channel of a multi-channel light at a particular angle, wherein a tilt of each mirror in the array may be adjusted independently of the other mirrors in the array.

8. The device of claim 7, wherein the optical device is a demultiplexing device, wherein the collimator is optically coupled at a side opposite to the at least one anamorphic pair of prisms to an input device for providing a multi-channel light and to at least one output device for receiving at least one channel of the multi-channel light.

9. The device of claim 8, wherein the multi-channel light comprises a circular cross-section.

10. The device of claim 9, wherein the multi-channel light is converted by the at least one anamorphic pair of prisms such that the multi-channel light comprises an anamorphic cross-section.

11. The device of claim 7, wherein the optical device is a multiplexing device, wherein the collimator is optically coupled at a side opposite to the at least one anamorphic pair of prism to at least one input device for providing a plurality of channels and to an output device for receiving a multi-channel light, wherein the multi-channel light comprises the plurality of channels.

12. The device of claim 11, wherein the plurality of channels each comprises a circular cross-section.

13. The device of claim 12, wherein each of the plurality of channels is converted by the at least one anamorphic pair of prisms such that the plurality of channels each comprises an anamorphic cross-section.

14. A system, comprising:
an input device for providing a multi-channel light;
an optical device, comprising:
a collimator optically coupled to the input device,
at least one anamorphic pair of prisms optically coupled to the collimator at a side opposite to the input device,
a diffraction grating optically coupled to the at least one anamorphic pair of prisms at a side opposite to the collimator, and
a focusing lens optically coupled to the diffraction grating; and
at least one output device optically coupled to the focusing lens at a side opposite to the diffraction grating for receiving at least one channel of the multi-channel light.

15. The system of claim 14, wherein the multi-channel light comprises a circular cross-section.

16. The system of claim 15, wherein the multi-channel light is converted by the at least one anamorphic pair of prisms such that the multi-channel light comprises an anamorphic cross-section.

17. A system, comprising:
at least one input device for providing a plurality of channels;
an optical device, comprising:
a focusing lens optically coupled to the at least one input device,
a diffraction grating optically coupled to the focusing lens at a side opposite to the at least one input device,
at least one anamorphic pair of prisms optically coupled to the diffraction grating, and
a collimator optically coupled to the at least anamorphic pair of prisms at a side opposite to the diffraction grating; and
an output device optically coupled to the collimator at a side opposite to the at least one anamorphic pair of prisms for receiving a multi-channel light, wherein the multi-channel light comprises the plurality of channels.

18. The system of claim 17, wherein the plurality of channels each comprises an anamorphic cross-section.

19. The system of claim 18, wherein the multi-channel light is converted by the at least one anamorphic pair of prisms such that the multi-channel light comprises a circular cross-section.

20. A system, comprising:
at least one input device for providing a plurality of channels;
an optical device, comprising:
a collimator optically coupled to the at least one input device,
at least one anamorphic pair of prisms optically coupled to the collimator at a side opposite to the at least one input device,
a diffraction grating optically coupled to the at least one anamorphic pair of prisms at a side opposite to the collimator,
a focusing lens optically coupled to the diffraction grating, and
a micro-mirror array optically coupled to the focusing lens at a side opposite to the diffraction grating, wherein each mirror in the array reflects at least one of the plurality of channels at a particular angle, wherein a tilt of each mirror in the array may be adjusted independently of the other mirrors in the array; and
an output device optically coupled to the collimator at a side opposite to the at least one anamorphic pair of prisms for receiving a multi-channel light comprising the plurality of channels.

21. The system of claim 20, wherein the plurality of channels each comprises a circular cross-section.

22. The system of claim 21, wherein each of the plurality of channels is converted by the at least one anamorphic pair of prisms such that the plurality of channels each comprises an anamorphic cross-section.

23. A system, comprising:
an input device for providing a multi-channel light;
an optical device, comprising:
a collimator optically coupled to the input device,
at least one anamorphic pair of prisms optically coupled to the collimator at a side opposite to the input device,
a diffraction grating optically coupled to the at least one anamorphic pair of prisms at a side opposite to the collimator,
a focusing lens optically coupled to the diffraction grating, and
a micro-mirror array optically coupled to the focusing lens at a side opposite to the diffraction grating, wherein each mirror in the array reflects at least one channel of the multi-channel light at a particular angle, wherein a tilt of each mirror in the array may be adjusted independently of the other mirrors in the array; and at least one output device optically coupled to the collimator at a side opposite to the at least one anamorphic pair of prisms for receiving at least one channel of the multi-channel light.

24. The system of claim 23, wherein the multi-channel light comprises a circular cross-section.

25. The system of claim 24, wherein the multi-channel light is converted by the at least one anamorphic pair of prisms such that the multi-channel light comprises an anamorphic cross-section.

26. A method for demultiplexing a multi-channel light, the multi-channel light comprising a circular cross-section, comprising the steps of:

(a) converting the multi-channel light such that the multi-channel light comprises an anamorphic cross-section;

(b) spatially dispersing a plurality of channels of the multi-channel light by:

(b1) diffracting the multi-channel light by a diffraction grating;

(b2) reflecting the plurality of channels by a micro-mirror array, wherein each mirror in the array reflects at least one of the plurality of channels at a particular angle, wherein a tilt of each mirror in the array may be adjusted independently of the other mirrors in the array; and (b3) condensing cross-sections of the reflected plurality of channels; and (c) outputting the spatially dispersed plurality of channels.

27. A method for multiplexing a plurality of channels, each of the plurality of channels comprising an anamorphic cross-section, comprising the steps of:

(a) combining the plurality of channels into a multi-channel light by:

(a1) reflecting the plurality of channels by a micro-mirror array at a particular angle, wherein a tilt of each mirror in the array may be adjusted independently of the other mirrors in the array; and (a2) diffracting the plurality of channels by a diffraction grating;

(b) converting the multi-channel light such that the multi-channel light comprises a circular cross-section; and (c) outputting the multi-channel light.

28. An demultiplexing device, comprising:

a collimator;

at least one anamorphic pair of prisms optically coupled to the collimator;

a diffraction grating optically coupled to the at least one anamorphic pair of prisms at a side opposite to the collimator; and a focusing lens optically coupled to the diffraction grating, wherein the collimator is optically coupled at a side opposite to the at least one anamorphic pair of prisms to an input device for providing a multi-channel light, and wherein the focusing lens is optically coupled at a side opposite to the diffraction grating to at least one output device for receiving at least one channel of the multi-channel light.

29. An multiplexing device, comprising:

a collimator;

at least one anamorphic pair of prisms optically coupled to the collimator;

a diffraction grating optically coupled to the at least one anamorphic pair of prisms at a side opposite to the collimator; and a focusing lens optically coupled to the diffraction grating wherein the focusing lens is optically coupled at a side opposite to the diffraction grating to at least one input device for providing a plurality of channels, and wherein the collimator is optically coupled at a side opposite to the at least one anamorphic pair of prisms to an output device for receiving a multi-channel light, wherein the multi-channel light comprises the plurality of channels.

30. An optical device, comprising:

a collimator;

at least one anamorphic pair of prisms optically coupled to the collimator;

a diffraction grating optically coupled to the at least one anamorphic pair of prisms at a side opposite to the collimator;

a focusing lens optically coupled to the diffraction grating; and a micro-mirror array optically coupled to the focusing lens at a side opposite to the diffraction grating, wherein each mirror in the array reflects at least one channel of a multi-channel light at a particular angle, wherein a tilt of each mirror in the array may be adjusted independently of the other mirrors in the array.

* * * * *